(12) United States Patent
Cheng et al.

(10) Patent No.: US 8,250,412 B2
(45) Date of Patent: Aug. 21, 2012

(54) METHOD AND APPARATUS FOR MONITORING AND RESETTING A CO-PROCESSOR

(75) Inventors: Jeffrey G. Cheng, Toronto (CA); Hing Pong Chan, Toronto (CA); Yinan Jiang, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 1971 days.

(21) Appl. No.: 10/672,180

(22) Filed: Sep. 26, 2003

(65) Prior Publication Data

US 2005/0081115 A1 Apr. 14, 2005

(51) Int. Cl.
*G06F 11/00* (2006.01)
(52) U.S. Cl. .......................... 714/47.1; 714/23; 345/503
(58) Field of Classification Search ................ 714/9, 23, 714/47.1; 345/503
See application file for complete search history.

(56) References Cited

U.S. PATENT DOCUMENTS

| | | | |
|---|---|---|---|
| 4,598,356 A | 7/1986 | Dean et al. | |
| 4,851,991 A | 7/1989 | Rubinfeld et al. | |
| 5,504,859 A * | 4/1996 | Gustafson et al. | 714/11 |
| 5,781,433 A * | 7/1998 | Nabeya et al. | 700/79 |
| 6,009,258 A | 12/1999 | Elliott | |
| 6,496,890 B1 | 12/2002 | Azevedo et al. | |
| 6,505,298 B1 | 1/2003 | Cerbini et al. | |
| 6,532,497 B1 | 3/2003 | Cromer et al. | |
| 6,543,002 B1 * | 4/2003 | Kahle et al. | 714/10 |
| 6,560,726 B1 | 5/2003 | Vrhel, Jr. et al. | |
| 6,591,379 B1 | 7/2003 | LeVine et al. | |
| 6,742,139 B1 * | 5/2004 | Forsman et al. | 714/23 |
| 2002/0093505 A1 * | 7/2002 | Hill et al. | 345/543 |
| 2004/0003312 A1 * | 1/2004 | Smith | 714/5 |

FOREIGN PATENT DOCUMENTS

| | | |
|---|---|---|
| EP | 0953908 A2 | 11/2012 |
| GB | 1 566 951 | 5/1980 |
| JP | 05324597 A * | 12/1993 |
| JP | 6-236299 | 8/1994 |
| WO | WO 00/76119 A1 | 12/2000 |

OTHER PUBLICATIONS

International Search Report for International Application No. PCT/IB2004/003089 dated Mar. 21, 2005.
Adrian S. de Almeida et al., "Method and Apparatus for Detecting a Fault Condition and Restoration Thereafter . . . ," U.S. Appl. No. 11/319,926, filed Dec. 28, 2005.
Ahmed. R E et al.; Cache-aided rollback error recover (CARER):algorithm for shared-memory multiprocessor systems; Jun. 26, 1990; International Symposium on Fault Tolerant Computer; pp. 82-88.
International Search Report for International Application No. PCT/IB2006/003815 dated May 23, 2007.
EP Office Action; EP Application No. 04769451.8; dated Mar. 3, 2009.
EP Office Action; EP Application No. 04769451.8; dated Nov. 16, 2006.

* cited by examiner

*Primary Examiner* — Philip Guyton
(74) *Attorney, Agent, or Firm* — Faegre Baker Daniels LLP (57) ABSTRACT

A circuit monitors and resets a co-processor. The circuit includes a hang detector module for detecting a hang in co-processor. The circuit also includes a selective processor reset module for resetting the co-processor without resetting a processor in response to detecting a hang in the co-processor.

28 Claims, 10 Drawing Sheets

METHOD AND APPARATUS FOR MONITORING AND RESETTING A CO-PROCESSOR

FIELD OF THE INVENTION

The invention relates generally to the detection and recovery from a hang in a computer system or other system, and more particularly, to apparatus and methods that detect a hang in, and provide recovery of co-processors.

BACKGROUND OF THE INVENTION

Constantly increasing demands for processing greater volumes of graphics data at faster speeds continues to drive developments in the area of accelerated graphics rendering. Current accelerated graphics rendering schemes are complex processes that require accurate design and implementation of both hardware and software components. Accelerated graphics rendering typically uses hardware, usually a graphics processor, and software, usually a graphics driver that is executed by a host processor, to optimize the processing of graphics data and video information. Any problems, such as a design flaw or implementation defect, can compromise accelerated graphics rendering and can cause the accelerated graphics rendering to stop functioning. Such problems can include defective graphics processors, bus controllers, central processing units (CPUs), or other hardware. Other problems can include defects in graphics drivers, operating systems, graphics applications or other software.

Because of the complexity of the hardware and software used in accelerated graphics rendering, and the added complexity when such hardware and software are combined in varying forms, graphics processors often experience various rendering errors, including complete hangs. A hang is where a system or process becomes non-responsive, such as where a processor hangs up due to the processor stalling, locking up, getting stuck in an infinite loop or the like. Currently, such hangs can cause data loss, as well as halting operations on the entire computer system. Unfortunately, the constant introduction of new accelerated graphics rendering hardware and software, and the corresponding large number of possible combinations therebetween, makes it difficult to completely identify and eliminate all possible errors that could cause errors in accelerated graphics rendering.

Currently, the methods used to detect errors in accelerated graphics rendering rely on operating system level detection of hangs in the graphics driver and do not directly detect a hang in the corresponding graphics processor. For example, the method used by Microsoft Windows XP® to detect if an error has occurred in the accelerated graphics rendering process is to detect if there is a hang in a graphics driver. Here, a "watchdog timer" measures the time spent in a graphics driver by performing a spin-loop and then waits for the graphics processor to respond. The detection of an infinite loop is used by the operating system as a sign that the graphics processor is likely hung. Once a timeout expires, the operating system stops the graphics driver, displays a notification to the user, and prompts the user to restart the computer. Here, the watchdog timer executes periodically without regard to whether rendering commands are currently being processed by the driver.

Microsoft Windows XP® is unable to differentiate between what appears to be a hang in the graphics driver from what is actually an ongoing execution of a large amount of rendering commands, as both appear as a slow response according to a predetermined waiting period. Also, with Microsoft Windows XP®, system resources are often wasted where the system attempts to determine whether the graphics driver is hung without regard as to whether the graphics driver has been issued any commands, i.e., whether it is currently idle. In addition, when Microsoft Windows XP® detects what it believes to be a hung graphics processor, the entire system must be restarted, forcing the user to terminate all hardware and software components regardless if they contributed to the hang in the graphics processor.

Another method used to detect a hung graphics driver is that used in the Microsoft Windows XP® Service Pack 1 (SP1). Here, the same "watchdog timer" is used, but in response to the detection of a hung graphics driver, the system unloads the graphics driver and loads a standard VGA driver in an attempt to continue graphics rendering operations in a non-accelerated mode. This design prevents data loss by allowing a user to save their work and restart the computer afterwards. However, using SP1, the advantages of operating in an accelerated graphics rendering mode are lost when the system switches into a non-accelerated mode. Also, like the Microsoft Windows XP® system, SP1 is unable to distinguish between a slow response from a graphics driver and a complete hang. In addition, when SP1 switches to a non-accelerated mode, the only way for the system to return to an accelerated graphics rendering mode is to perform a total system restart. Here again, the user is forced to terminate all hardware and software components regardless if such components contributed to the hang in the graphics processor.

BRIEF DESCRIPTION OF THE DRAWINGS

The invention will be more readily understood with reference to the following drawings wherein like reference numbers represent like elements and wherein.

DETAILED DESCRIPTION OF THE PREFERRED EMBODIMENT

Briefly, a circuit monitors and resets a co-processor. The circuit includes a hang detector module for detecting a hang in co-processor. The circuit also includes a selective processor reset module for resetting the co-processor without resetting a processor in response to detecting a hang in the co-processor.

As used in this document, the term module refers to a functional subset of a larger set of functional circuitry. The term circuitry includes at least one of the following: one or more processors executing instructions, such as microprocessors, digital signal processors (DSPs), microcontrollers or discrete logic, state machines or any suitable combination of hardware, software and/or firmware. One of ordinary skill in the art will recognize that one or more modules may be combined as the larger set of the functional set of circuitry. Further, any functionality from one module can be moved from one module to another.

As used in this document, the term co-processor means a second processor with respect to a first processor. Such co-processors, for example, can include a general processor, a peripheral device processor (e.g., a graphics processor, an audio processor or the like), or other like processors.

As used in this document, the term processor hang is used to describe a processor that is no longer responsive to input from outside the processor such as when a processor is caught in an infinite loop. In such cases the processor needs to be rebooted or reset for the processor to once again be responsive to external input and to otherwise operate as the device was designed.

During a reset of a co-processor, typically, one or more of the software and/or hardware components associated with the processor are reset such that the processor can operate in accordance to its intended design. Resets can include the type of reset performed at power-up or boot up time, as is typically performed when the processing device is powered-up. However other resets can be performed that are not the same as the power-up reset. A reset can be a number of different types of resets available for the particular co-processor. In one embodiment, any number of different types of resets may be performed in response to detecting a hang in a co-processor. In this embodiment, each different reset is tailored to the detected state or status of the co-processor or other associated components at or before the time of the reset. What is a typical objective of the reset performed, is that the results of the reset eliminate the hang in the co-processor and allow the processor to resume the successful processing of instructions.

In one embodiment, an advantage is provided such that a hang in a specific co-processor need not require the resetting of any other processor except the hung co-processor. As such, other applications running on the same processing device remain generally unaffected from a hang and any subsequent reset. For example, a processor, that is processing other co-processor instructions or other applications, is not affected by the resetting of the co-processor. In one embodiment the processor executes the instructions for the circuit that monitors and resets the co-processor. Further, the processor continues to execute the instructions while the hung co-processor is reset.

In one embodiment, an advantage is provided such that a separate process is provided, from those typically provided by the operating system, which separately monitors whether a particular application/co-processor is hung. Because the process is separate from the corresponding processes available through the operating system, the separate process can be tailored to include specific functions particularly suited for detecting and resetting a hang of a specific processor. For example, a hang detection process can be tailored to the specific processor such that particular checking of certain software and/or hardware status can be that which is most efficient to detect a hang in that specific processor.

In one embodiment, an advantage is provided such that the process that determines whether a hang has occurred in a target co-processor is executed only when the processor is busy. Here, an idle processor that has not yet executed any instructions, and is therefore very unlikely to be experiencing a hang, need not be examined for the presence of a hang. Even if somehow such processor was somehow experiencing a hang, the fact that the processor is not currently needed, nor may never be, the current system provides the benefit of ignoring the hung state of the particular processor until the process is actually needed. Systems that check periodically as to whether such processors are hung, regardless of whether such processors are needed, both waste system resources and introduce the possibility that the system will need to be rebooted because of the detection of a hung process that the system does not yet need.

In one embodiment of the invention, an advantage is provided such that applications specifically directed to co-processors can now take over the duties of determining whether the associated co-processor is experiencing a hang. This can potentially free up those hang detection processes, typically used by operating systems to determine if a hang has occurred.

In one embodiment, the system can pause communications with the hung processor during the time the processor is reset. This provides the advantage of preventing any further destabilization of the co-processor.

In one embodiment, the system, after attempting to reset a hung processor, checks to determine if the reset was successful before allowing such processor to continue execution. This provides the advantage of preventing a processor from attempting to continue processing after an unsuccessful reset.

In one embodiment, the system determines whether to resume the operations of a co-processor, after having reset the processor, by determining whether the formerly hung processor is now fully functioning. This provides the advantage of preventing the processor from attempting to restart processing when it is determined that the processor is not fully functioning. In one embodiment, the system first checks to determine if the reset was successful, and if so, determines if the formerly hung processor is fully functioning, and if so, allows for the resumed use of such processor.

In one embodiment, the system saves a snapshot of the associated hardware and software status for the purpose of debugging the system to determine why a processor hang occurred. This provides the advantage of saving information that can be used to identify processing problems such that the sources of such problems can be resolved in subsequent upgrades in the software and/or hardware. In one embodiment, the information saved includes one or more of the following: software or driver version, error report format version, accelerated graphics port (AGP) speed; AGP version supported, graphics processor device ID, graphics processor vendor ID, graphics processor subsystem ID, chipset device ID, chipset vendor ID, error flags, system memory size, graphics frame buffer size, engine clock, memory clock, and internal co-processor status, including register values and command queue data.

In one embodiment, the system allows the sending of hardware and software status to a remote location such as the email address of the vendor of the co-processor. This provides the advantage of the vendor being able to receive valuable information as to how their product may be failing in the field and therefore be made aware of processing problems earlier and in more detail than current techniques.

Figure 1:
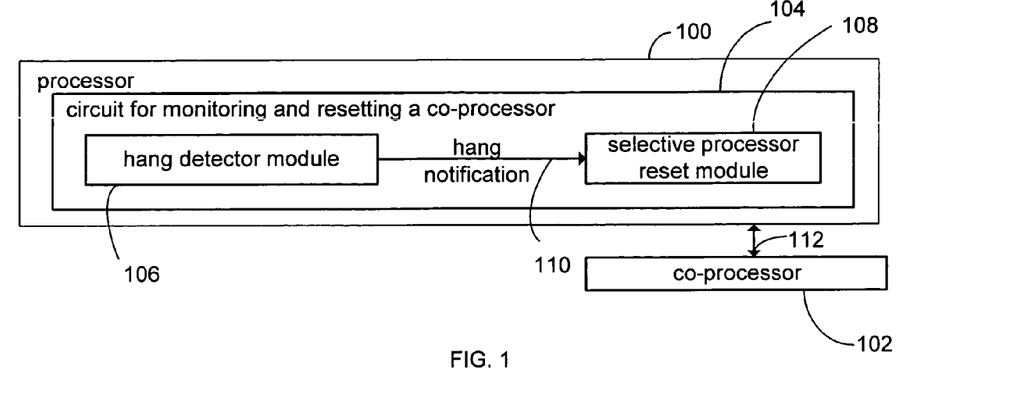
FIG. 1 is a block diagram illustrating one example of a circuit for monitoring and resetting a co-processor, in accordance with one embodiment of the invention.

FIG. 1 illustrates a processor 100, a co-processor 102, a circuit for monitoring and resetting a co-processor 104, a hang detector module 106, a selective processor reset module 108, a hang notification signal 110, and a suitable link 112 connecting the co-processor 102 to the processor 100.

The circuit for monitoring and resetting a co-processor 102 includes the hang detector module 106 and the selective processor reset module 108. In this example, the circuit for monitoring and resetting the co-processor 104 is in the form of one or more software modules executed by the processor 100 such as a driver executed by the co-processor 104. The circuit for monitoring and resetting the co-processor 104 includes the hang detector module 106 and the selector processor reset module 108. The hang detector module 106 is used to detect a hang in a co-processor. The hang detector module 106 monitors a co-processor 102 in an effort to identify when a hang in a co-processor 102 occurs. For example, the hang detector module 106 may periodically examine the co-processor 102 to determine whether it is currently hung. In one embodiment the hang detector module 106 only attempts to determine whether the co-processor 102 is hung at a time when a new instruction for the co-processor is sent. In another embodiment, the hang detector module 106 attempts to determine whether the co-processor 102 is hung at a time at which the co-processor 102 is known to have been assigned instructions for execution.

For example, the hang detector module 106 examines a flag that indicates whether the co-processor 102 is currently executing instructions, and if so, the same hang detector module 106 then examines corresponding registers associated with the co-processor 102 to determine whether activity in those registers is occurring that reflects the actual processing of such instructions. Where a discrepancy between the activity, or lack of activity, in such registers is detected, the hang detector module 106 then returns a hang notification signal 110 to the selective processor reset module 108 indicating that a hang has been detected in the co-processor 102.

In one embodiment, more specifically, the hang detector module 106 first checks to see if a busy flag is set. If the busy flag is determined not to be set, the hang detector module 106 returns a no-hang notification signal (not shown) to the selector processor reset module 108. If the busy flag is determined to be set, the status or contents of particular registers are examined and saved (those used to monitor the co-processor's 102 activity). Next, a wait period is allowed to pass to allow activity in the particular registers to occur. Again the status or contents of particular registers are saved, or are at least their contents are examined and made available for a comparison to occur. Finally a comparison is performed between the two sets of contents of the registers as occurred on either side of the wait period. If a difference is detected then a no-hang notification signal (not shown) to the selector processor reset module 108. Otherwise, if no difference is detected then the hang detector module 106 returns a hang notification signal 110 to the selector processor reset module 108.

When the selective processor reset module 108 receives a hang notification signal 110, indicating that a hang has occurred in co-processor 102, the selective processor reset module 108 selectively resets the co-processor 102 without resetting the processor 100. In one embodiment the reset performed by the selective processor reset module 108 is the same reset that is performed at power-up or reboot time. In such embodiment, the entire co-processor may be reset. In another embodiment the reset performed may include only the resetting of a subset of the hardware typically reset at power-up time. In one embodiment, multiple sub-processors (not shown) are associated with the co-processor 102. In this embodiment, the reset is performed on each sub-processor, while in another embodiment, only a subset of the sub-processors are reset. An example of such sub-processors, as related to a graphics processor, are 2D rendering engines, 3D rendering engines, 3D pixel pipe and the like.

In another embodiment the reset function would be called multiple times, for example, sixteen times, to assure that the reset was successful. In another embodiment the reset that is performed is a resetting of the entire co-processor by simulating the reset signal on the bus (such as a reset performed when rebooting the system). In such embodiment, a specific value is written to a specific location in Peripheral Component Interconnect (PCI) space. This embodiment provides the advantage of being able to perform the reset of all hardware hangs that the circuit for monitoring and resetting a co-processor 108 can detect.

In another embodiment the reset performed is a reset that is specifically designed to execute upon the detection by the hang detector module 106 of a hang in the co-processor 102. Although in the current embodiment the selective processor reset module 108 resets only the co-processor 102, in another embodiment a reset is performed on additional processors.

In one embodiment, the hang detector module 106 is executed by the processor 100. In another embodiment the processor 100 is a CPU. In one embodiment, the hang detector module 106 detects a hang in co-processor 102 and sends a hang notification signal 110 to the selective processor reset module 108 indicating that a hang was detected. In one embodiment, the selective processor reset module 108 is executed by the processor 100 and a reset is performed on the co-processor 102 while allowing the processor 100 to continue to execute the instructions of the circuit for monitoring and resetting a co-processor 104.

In one embodiment, the co-processor 102 is a graphics processor and the instructions being executed by the graphics processor are graphics rendering commands. The graphics processor contains a busy flag to indicate whether the graphics processor is currently executing instructions. In one embodiment, the graphics processor has registers that are used to perform graphics rendering instructions. To determine if a hang has occurred in the graphics processor, the hang detector module 106, detects that the busy flag is set and continues to examine the activity in one or more of the graphics processor registers to determine if the activity therein represents the execution of graphics rendering commands. If there is a discrepancy between the busy flag and the activity seen in the graphics processor registers, then the hang detector module 106 will send a hang notification signal 110 to the selective processor reset module 108. The selective processor reset module 108 will then perform a reset of the graphics processor. In one embodiment, if the busy flag indicates that the processor is not busy then the system does not check whether there is any activity in the associated registers.

Figure 2:
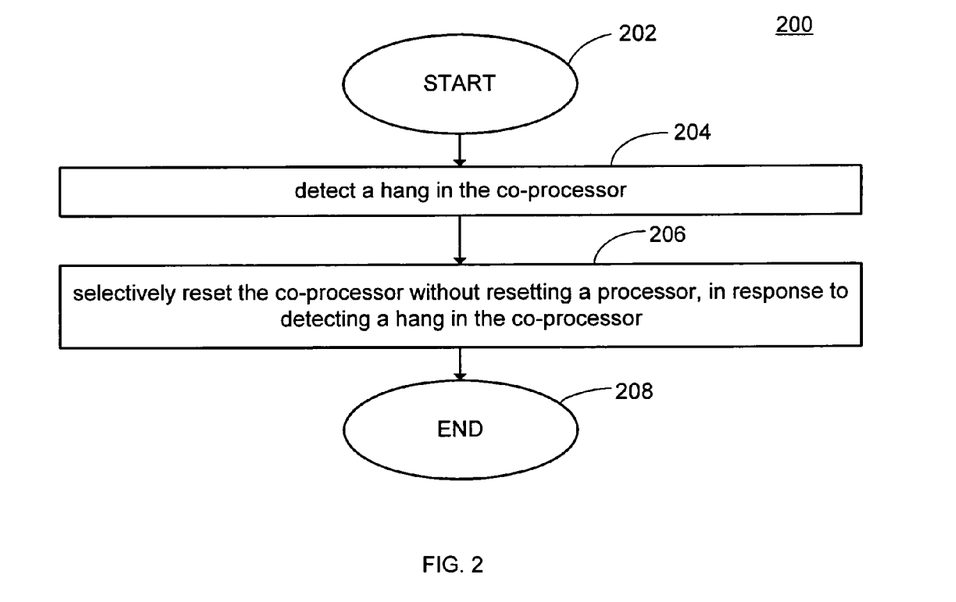
FIG. 2 is a flow chart illustrating one example of a method for monitoring and resetting a co-processor, in accordance with one embodiment of the invention.

FIG. 2 shows a method 200 of using the circuit for monitoring and resetting a co-processor 104. After a start node is performed at step 202, step 204 is then performed in which the system detects a hang in the co-processor. In one embodiment, as discussed above regarding FIG. 1, the step of detecting a hang in the co-processor 102 may be achieved by identifying a discrepancy between a busy flag associated with such co-processor 102 and the corresponding registers. In this embodiment, the hang detector module 106 determines that a busy flag is set but that the activity in the corresponding registers indicate that the co-processor 102 is hung. Also as discussed above, in one embodiment, the system detects a hang in the co-processor 102 at a time when the new instruction or instructions is or are sent to the co-processor 102. Yet in another embodiment the hang detector module 106 identifies a hang in the co-processor at any time for which the busy flag is set. In one embodiment the detector module 106 periodically continues to identify a hang in the co-processor 102 as long as the busy flag is set. Once a hang is detected by the hang detector module 106 the hang detector module 106 sends a hang notification signal 110 to the selective processor reset module 108.

In step 206, the selective processor reset module 108, upon receiving a hang notification signal 110 that the co-processor 102 is hung, selectively resets the co-processor 102 without resetting the processor 104. Also, as discussed above regarding FIG. 1, the processor that is not reset is the processor that is executing the circuit for monitoring and resetting a co-processor 104. In another embodiment, processor 104 is the host processor or CPU and is executing one or more system processes or applications in addition to the circuit for monitoring and resetting a co-processor 104.

Figure 3:
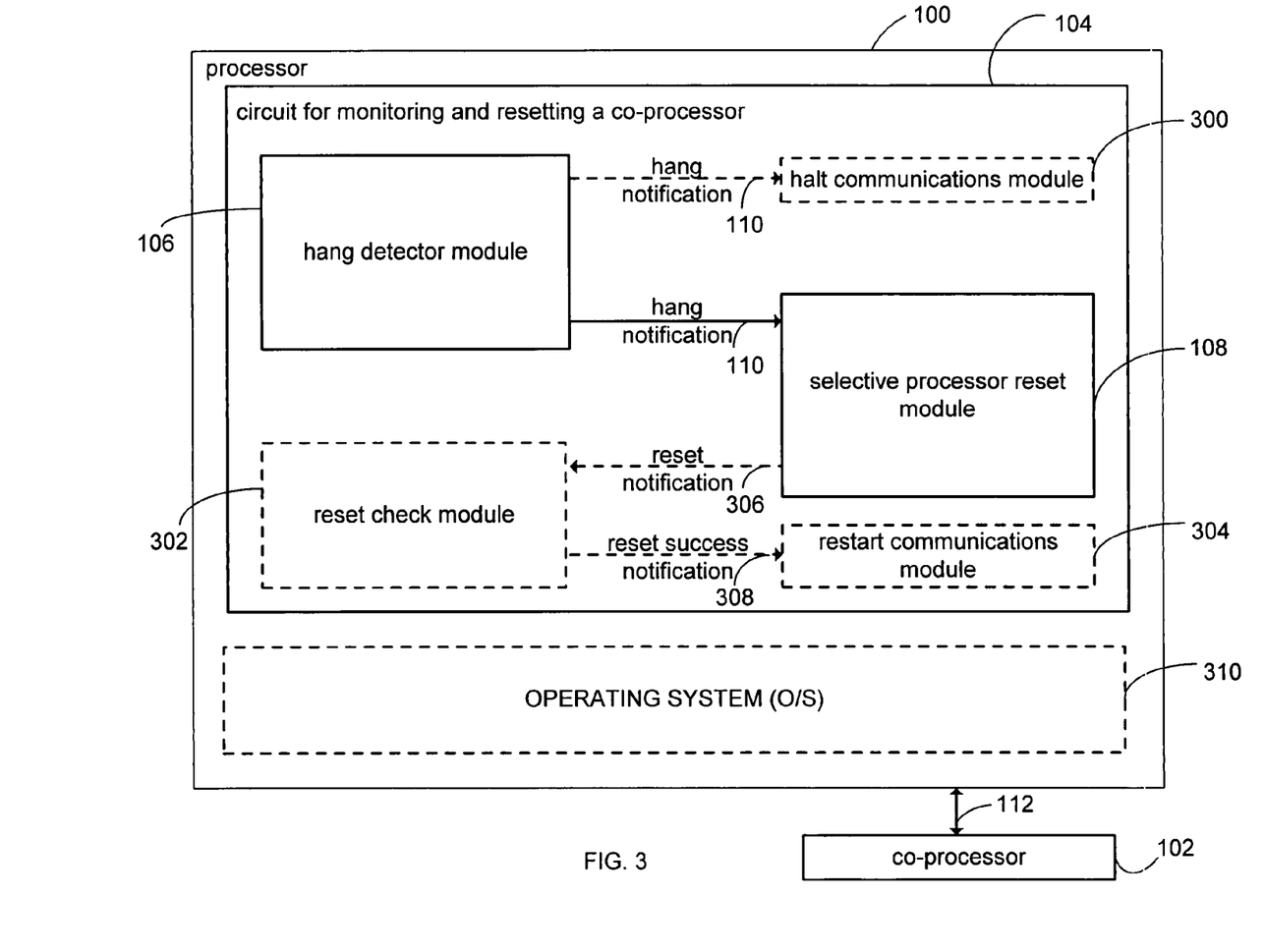
FIG. 3 is a block diagram illustrating one example of a circuit for monitoring and resetting a co-processor, in accordance with one embodiment of the invention.

FIG. 3 illustrates a processor 100, a co-processor 102, a circuit for monitoring and resetting a co-processor 104, a hang detector module 106, a selective processor rest module 108, and suitable link 112 connecting the co-processor 102 to the processor 100. In addition, optional components are also shown, and are indicated by dashed lines, and include the halt communications module 300, the reset check module 302, the restart communications module 304, hang notification signal 110, reset notification signal 306, reset success notification signal 308 and operating system 310.

In one embodiment, the halt communications module 300 is used to halt command communications with the co-processor 102 in response to receiving a hang notification signal 110 from hang detector module 106 indicating a hang in the co-processor 102. The halt communications module 300 stops the sending of instructions to the co-processor 102 in response to receiving a hang notification signal 110. In one embodiment this is achieved when the halt communications module 300 sets a send flag to off to prevent the further sending of instructions to the co-processor 102. In another embodiment, the halt communications module 300 sets a receive flag to off to indicate that there is nothing to be received back from the graphics processor, or in other words, that there are no pending instructions currently executing on the co-processor 102 which will return signals, data or the like. In another embodiment, both the send flag and receive flag are set accordingly. Yet in another embodiment, the function of the receive flag is replaced by the busy flag such that when the busy flag is set it is presumed that the co-processor 102 will be returning a signal, data or the like, and when the busy flag is off it is presumed that the co-processor 102 will not be returning any such information. As such, in this embodiment, the selective processor reset module 108 sets the busy flag to off and the co-processor 102 is reset.

The reset check module 302, in response to receiving a reset notification signal 306 from the selective processor reset module 108, determines if the reset has been successful, and if true, the reset check module 302 then generates a reset success notification signal 308. In one embodiment, the reset success notification signal 308 is sent to a restart communications module 304.

In one embodiment, restart communications module 304 is used. Here, the restart communications module 304 is responsive to receiving a reset success notification signal 308 to restart a command communications with a co-processor 102. In one embodiment this is achieved by setting a send flag to on (See FIG. 6). In another embodiment, this is achieved by setting both a send flag to on and a receive flag to on. However, as discussed above regarding the halt communications module 300, one embodiment sets a busy flag on in place of setting a receive flag to on.

Figure 4:
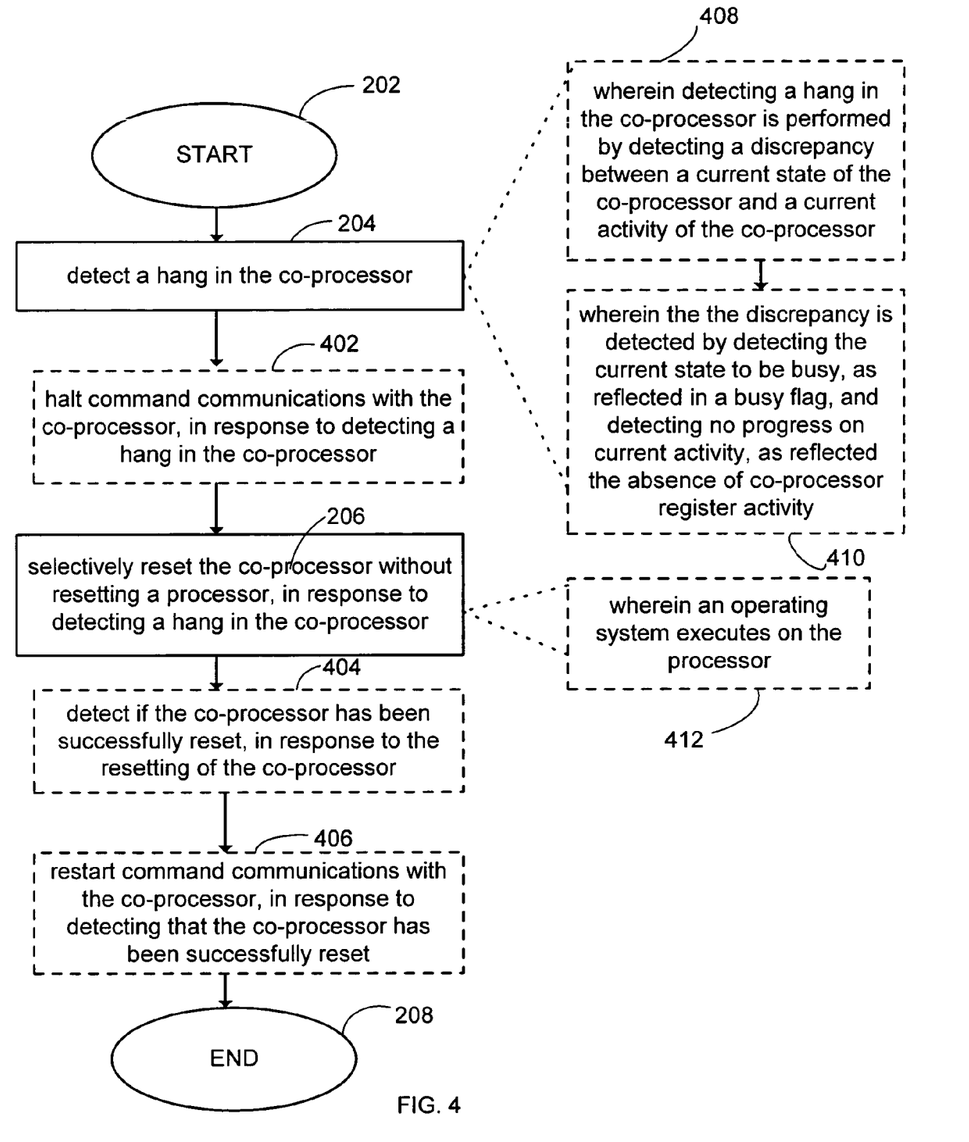
FIG. 4 is a flow chart illustrating one example of a method of monitoring and resetting a co-processor, in accordance with one embodiment of the invention.

FIG. 4, in addition to illustrating three optional steps 402, 404 and 406, shown in dashed lines, and two required steps 204 and 206 shown in solid lines, also shows two optional step limitations 408 and 410 as related to the step 204, and one optional step limitation 412 as related to step 206. Here, the start node and end nodes, 202 and 208, are the same as those of FIG. 2. In addition, the steps 204 and 206 represent the same steps described and shown in the FIG. 2. In step 402 the system halts command communications with the co-processor 102 in response to the detection of a hang in the co-processor 102. In step 404, the system detects if the co-processor 102 has been successfully reset in response to the resetting of the co-processor 102. In step 406, the system restarts command communications with the co-processor 102 in response to detecting that the co-processor has been successful reset.

As noted in step limitation 408, step 204 is limited to detecting a hang in the co-processor by detecting a discrepancy between a current state of the co-processor 102 and a current activity of the co-processor 102. Step limitation 410 places further limits on the limits introduced in step limitation 408, such that the discrepancy is detected by detecting the current state to be busy as reflected in a busy flag and detecting the current activity the idle as reflected in the absence of co-processor register activity. Step limitation 412 limits step 206 such that an operating system 310 executes on the processor 100.

Figure 5:
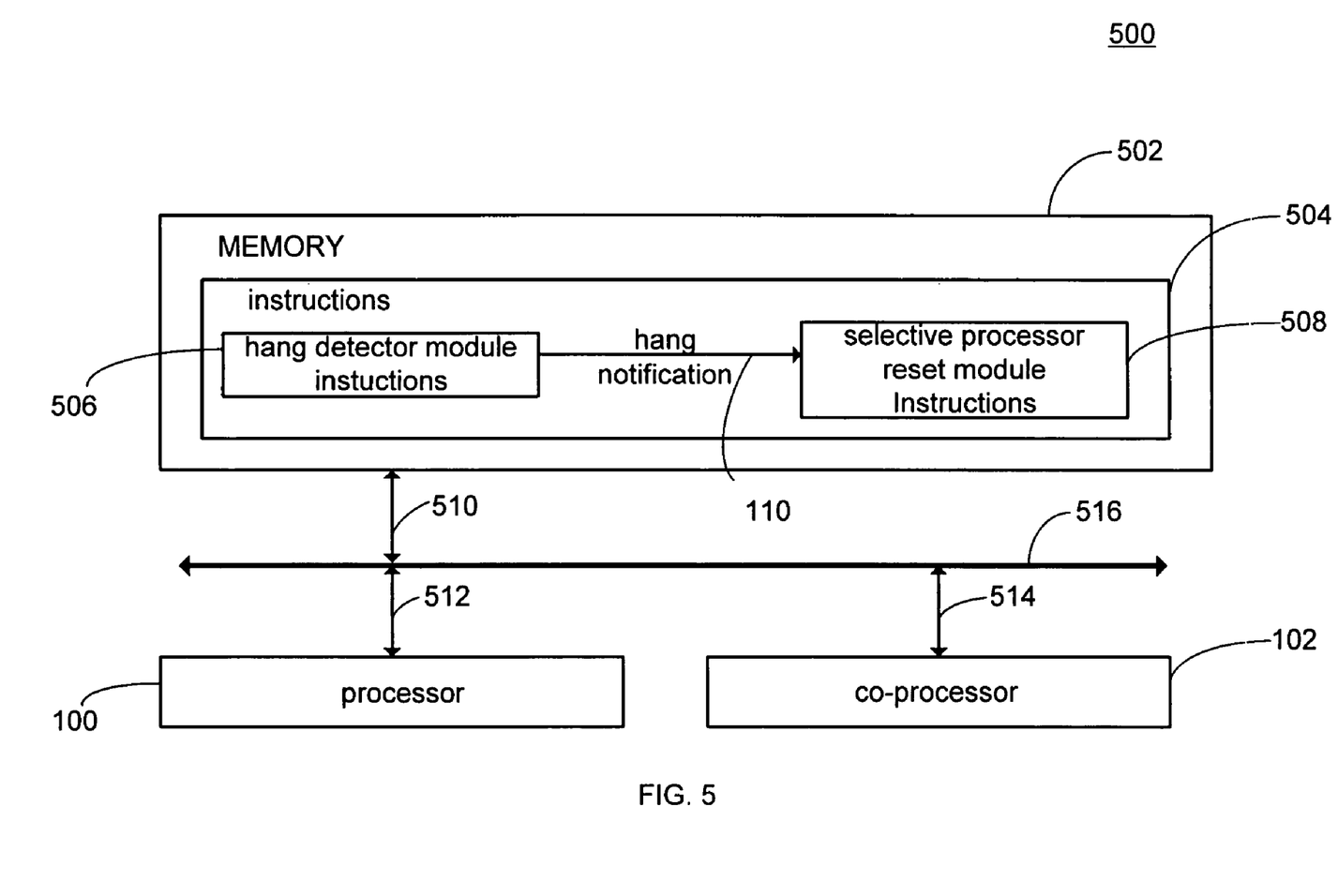
FIG. 5 is a block diagram illustrating one example of a system for monitoring and resetting a co-processor, in accordance with one embodiment of the invention.

FIG. 5 illustrates an example of a system 500 for monitoring and resetting the co-processor 102 including a processor 100, a co-processor 102, a memory 502, instructions 504, hang detector module instructions 506, selective processor rest module instructions 508, suitable connections, 510, 512, 514 and 516, between the memory 502 and the processor 100 and co-processor device 102. Further, the hang notification signal 110 is generated by the hang detector module instructions 506 to the selective processor reset module instructions 508 when a hang is detected in co-processor 102. As used herein, memory 502 may be any one of the following: RAM, ROM, optical or magnetic memory, or any suitable memory that is capable of storing digital information. The memory can be a system memory, other memory accessible to the system or the specific local memory of a co-processor.

The set of instructions 504 are instructions suitable to be executed on a suitable processor 100 and includes the hang detector module instructions 506 and the selective processor reset module instructions 508. Connections 510, 512, 514 and 516 represent suitable electronic connections including hard wired connections, bridges or busses or the like. In one embodiment, connection 516 represents a host bus. The detailed operation of the system illustrated in FIG. 5 is similar to that described above regarding FIG. 1 and FIG. 2.

Figure 6:
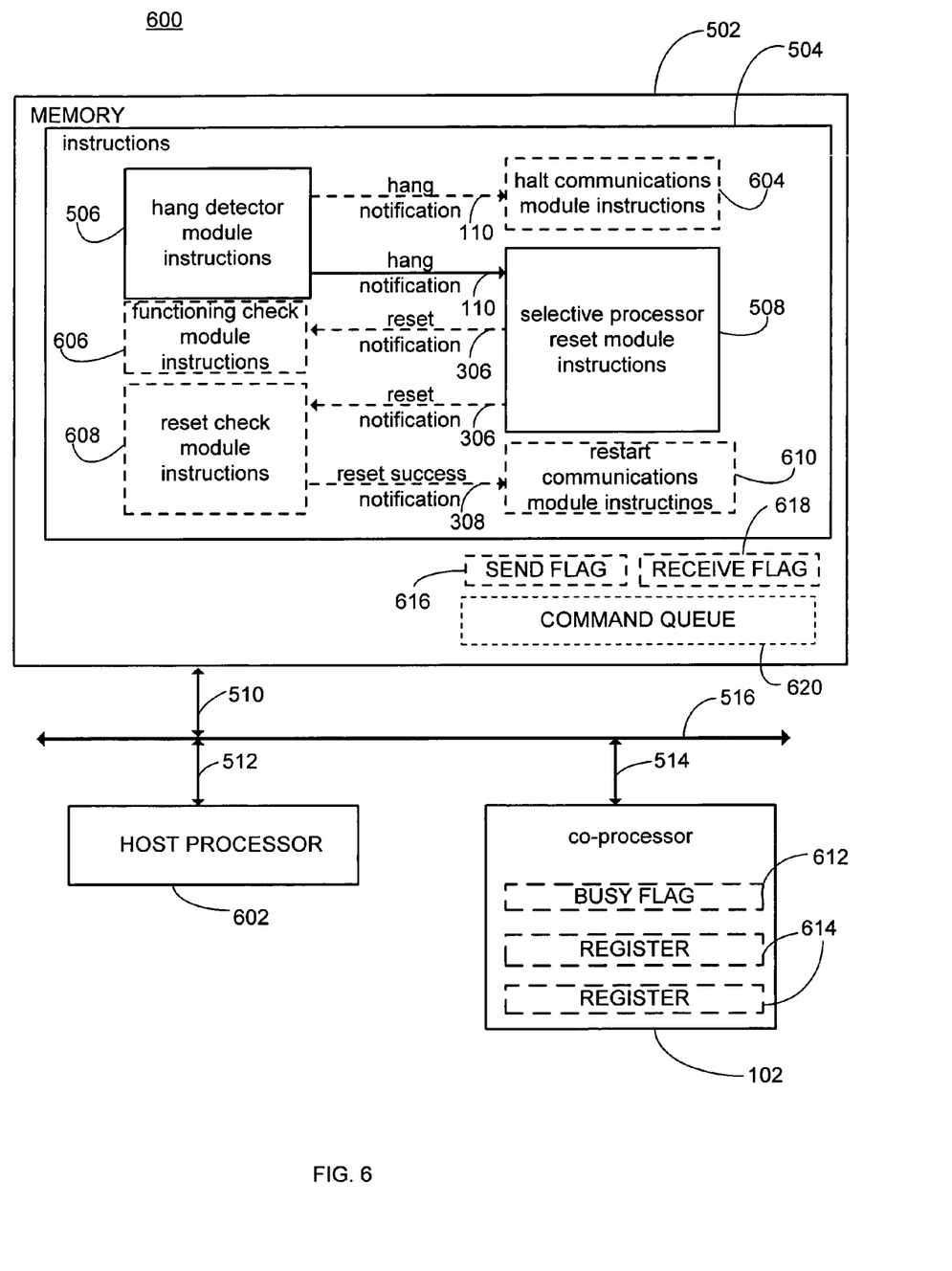
FIG. 6 is a block diagram of one example of a system for monitoring and resetting a co-processor, in accordance with one embodiment of the invention.

FIG. 6 illustrates a system 600 for monitoring and resetting a co-processor 102 including the components shown in FIG.

5, except the processor 100 is replaced with host processor 602. In one embodiment the host processor is a CPU. In addition, the following optional instruction modules are included: halt communications module instructions 604, functioning check module instructions 606, reset check module instructions 608 and restart communications module instructions 610. In this embodiment, co-processor 102 contains busy flag 612 and registers 614. In addition, memory 502 contains a send flag 616, a receive flag 618 and a command queue 620.

As discussed above regard to FIG. 1, send flag 616 is used to control communications sent to the co-processor 102. Also described in FIG. 1, the receive flag 618 is used to control the receiving of information from co-processor 102. Command queue 620 is populated via the execution of the instructions 504. In operation, when send flag 616 is on, then the execution of instructions 504 are free to be sent to co-processor 102 via the command queue 620. As the co-processor 102 is ready to execute a next command, the co-processor 102 retrieves the next commands from the command queue 620. Therefore the setting of send flag 616 to off prevents the instructions 504 from executing to populate the command queue 620, thus, co-processor process 102 is prevented from accessing new additional instructions. Also as discussed above regarding FIG. 1, busy flag 612 can be used along with registers 614 to determine whether the co-processor is currently experiencing a hang. Also as discussed with regard to FIG. 1, the busy flag 612 can also be used as a receive flag 618.

Figure 7:
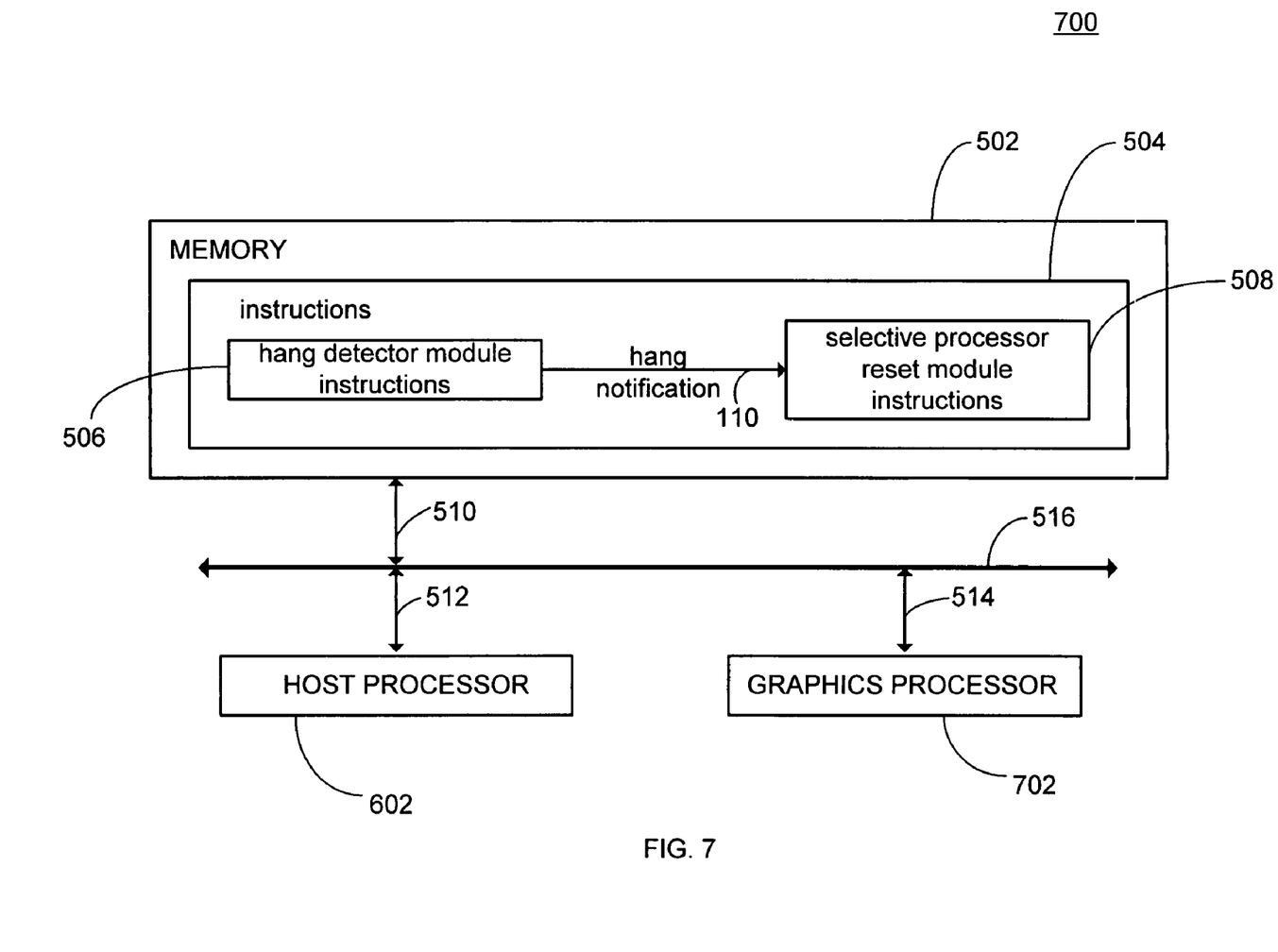
FIG. 7 is a block diagram of one example of a system for monitoring and resetting a co-processor, including a graphics processor, in accordance with one embodiment of the invention.

FIG. 7 illustrates a system 700 for monitoring and requesting a selective processor reset of the graphics processor 702 similar to that shown in FIG. 5 except that in place of the processor 104, is a host processor 602, and in place of the co-processor 102, is a graphics processor 702.

Figure 8:
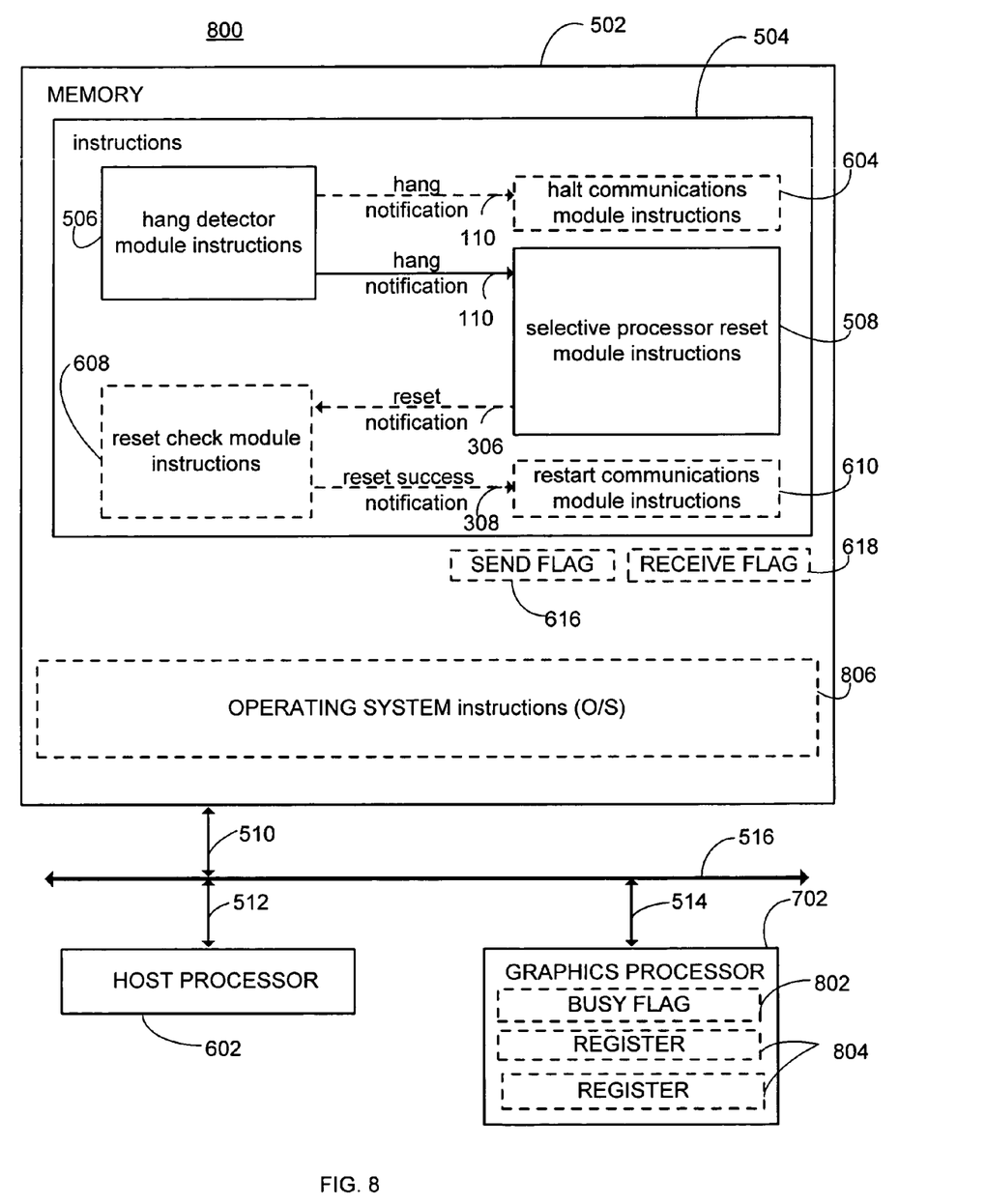
FIG. 8 is a block diagram of one example of a system for monitoring and resetting a graphics processor, in accordance with one embodiment of the invention.

FIG. 8 illustrates a system 800 for monitoring and requesting a selective processor reset of the graphics processor 702 similar to that of the system shown in FIG. 6 except that the co-processor 102 is replaced with the graphics processor 702. In addition, the co-processor busy flag 612 and the corresponding registers 614 have been replaced with the graphics processor busy flag 802 and the corresponding graphics registers 804.

Figure 9:
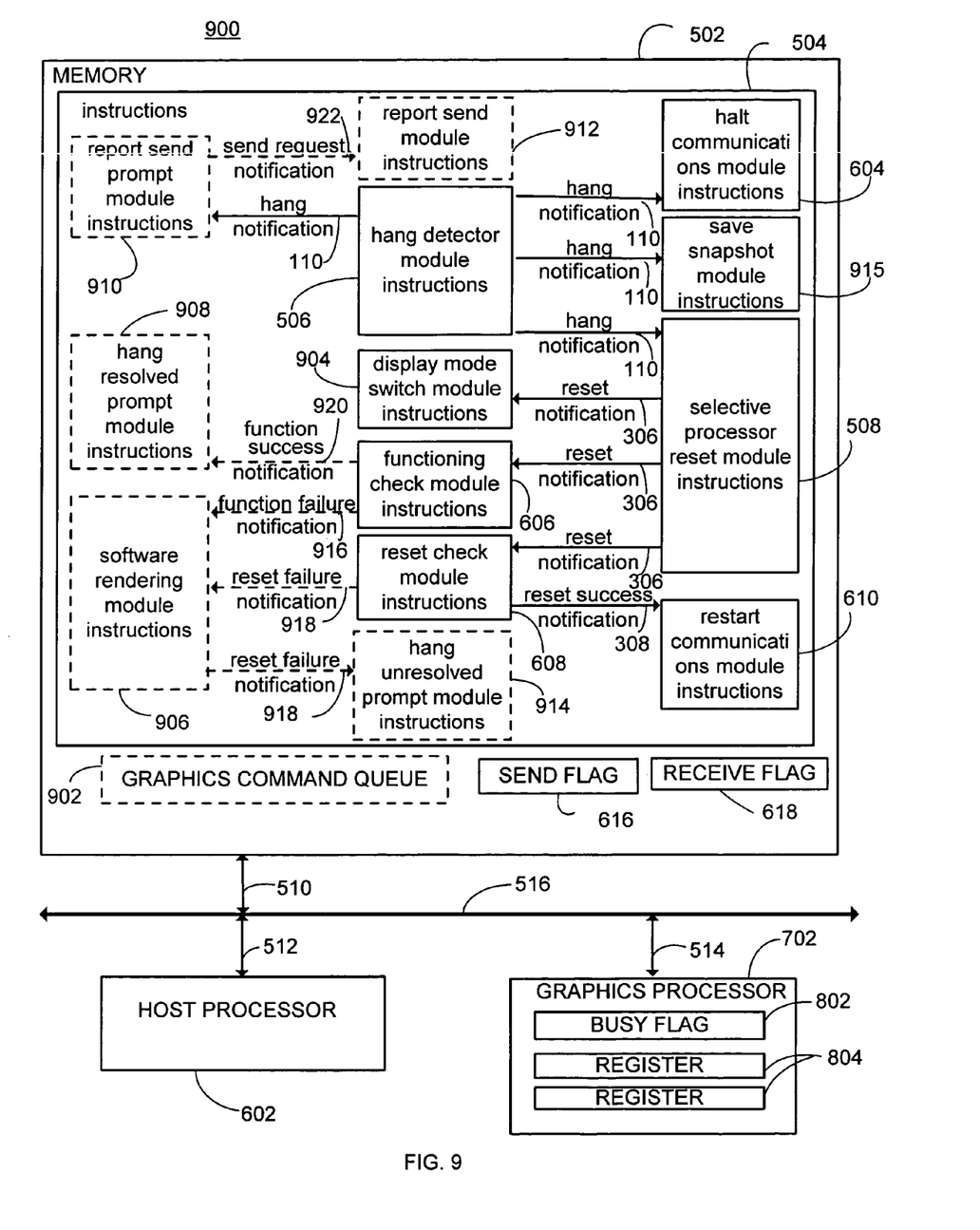
FIG. 9 illustrates one example of a system for monitoring and resetting a graphics processor, in accordance with one embodiment of the invention.

FIG. 9 illustrates a system 900 for monitoring and requesting a selective processor reset of graphics processor 702. The system of FIG. 9 is similar to that of FIG. 8 except that the memory 502 also includes a graphics command queue 902 and eight additional instruction modules. The eight new instruction modules include the display mode switch module instructions 904, the software rendering module instructions 906, the hang resolved prompt module instructions 908, the report send prompt module instructions 910, the report send module instructions 912, the hang unresolved prompt module instructions 914, the functioning check module instructions 606 and the save snapshot module instructions 915. Also different from FIG. 8 is that the reset check module instructions 608, the halt communications module instructions 604 and the restart communications module instructions 610 are not optional.

The display mode switch module instructions 904 operate in response to the receipt of a reset notification signal 306 to perform a display mode switch. A display mode switch is the sending of a request to the host system requesting that all windows on a display be refreshed. In one embodiment, having multiple sub-processors (not shown), the display mode switch module instructions 904 operate to cause only a subset of the sub-processors to be reset. The software rendering module instructions 906 operate in response to detecting a function failure notification signal 916, or a reset failure notification signal 918, such that a dynamic switch to a software rendering mode is performed. The invoking of a dynamic switch to a software rendering mode results in a the system operating in a software rendering mode in which the system allows users to save their work before a reboot of the graphics processor 702 is performed. The hang resolved prompt module instructions 908 execute in response to a function success notification signal 920 such that a prompt is displayed indicating that a hang was detected and resolved. One embodiment does not include the hang resolved prompt module 908, and as such, no display is performed.

The report send prompt module instructions 910 operate in response to a hang notification signal 110. A prompt is displayed requesting input from user as to whether the user wants to have an error report sent to a remote location. In one embodiment, the remote location is the vendor who designed and owns the application that is running or attempting to run on the graphics processor. In one embodiment the information included in the report includes the hardware and software status information discussed above regarding FIG. 3. The report send module instructions 912 operate in response to a send request notification signal 922 sent in response to the request that a report be sent to a remote location. The report send module instructions 912 sends an error report to a remote location including the hardware and software status. Next, the hang unresolved prompt module instructions 914, operating in response to a reset failure notification signal 918 as initially generated from the reset check module 608 (or operating in response to a function failure notification signal 916 as generated from the functioning check module instructions 606), the hang unresolved prompt module 914, generates a prompt that indicates that a hang was detected and cannot be resolved without a reset of the host processor. In one embodiment, the hang unresolved prompt module 914 is absent, and as such, no display is performed.

In one embodiment, where the functioning check module instructions 606 are utilized, and in response to receiving a reset notification signal 306 to determine if a co-processor is fully functioning, the functioning check module instructions 606 determines if the graphics processor 702 is fully functioning. If so, the functioning check module instructions 606 generate a function success notification signal 920 that is sent to the restart communications module instructions 610, which will only then perform a restart of the graphics processor 702.

In another embodiment, the functioning check module instructions 606 will generate a functioning success notification signal 920 to be processed by the hang resolved prompt module instructions 908. In another embodiment the functioning check module instructions 606 will generate a function failure notification signal 916 to be processed by the software rendering module instructions 906. In one embodiment, the functioning check module instructions 606 perform the function of determining if the co-processor 102 has been fully reset. This is done by sending one or more instructions to the co-processor 102 instructing it to copy data from one memory location to another, and to compare the data stored in the two locations to determine if a copy command was successfully performed. Here, what is important is that the co-processor 102 performs an operation for which the results can be analyzed to determine if the operation was successfully performed.

In one embodiment, the functioning check module instructions 606 are only called if a reset success notification signal 308 has been generated by the reset check module instructions 302. As such, in such embodiment, the functioning check module instructions 606 are only performed if a successful reset of the co-processor 102 has been detected. In one embodiment, if the processor is determined not to be fully functioning, then the CPU takes over in the performance of the graphics processor rendering. In this case the graphics acceleration is lost in place of non-accelerated graphics rendering being performed on a CPU.

The save snapshot module instructions 915 operate to save a snapshot of the hardware and software status associated with the co-processor 102. The snapshot is generated in response to receiving a hang notification signal 110 as generated from the hang detector module instructions 506. In one embodiment the hardware and software status includes register data associated with the co-processor 102, graphics command queue data associated with the co-processor 102, chip set information, and AGP port information. A snapshot of the hardware and software status is intended to capture that data associated with the operation of the co-processor 102 such that an analysis of such data will be beneficial in debugging the reasons as to why the co-processor 102 experienced its hang.

Figure 10:
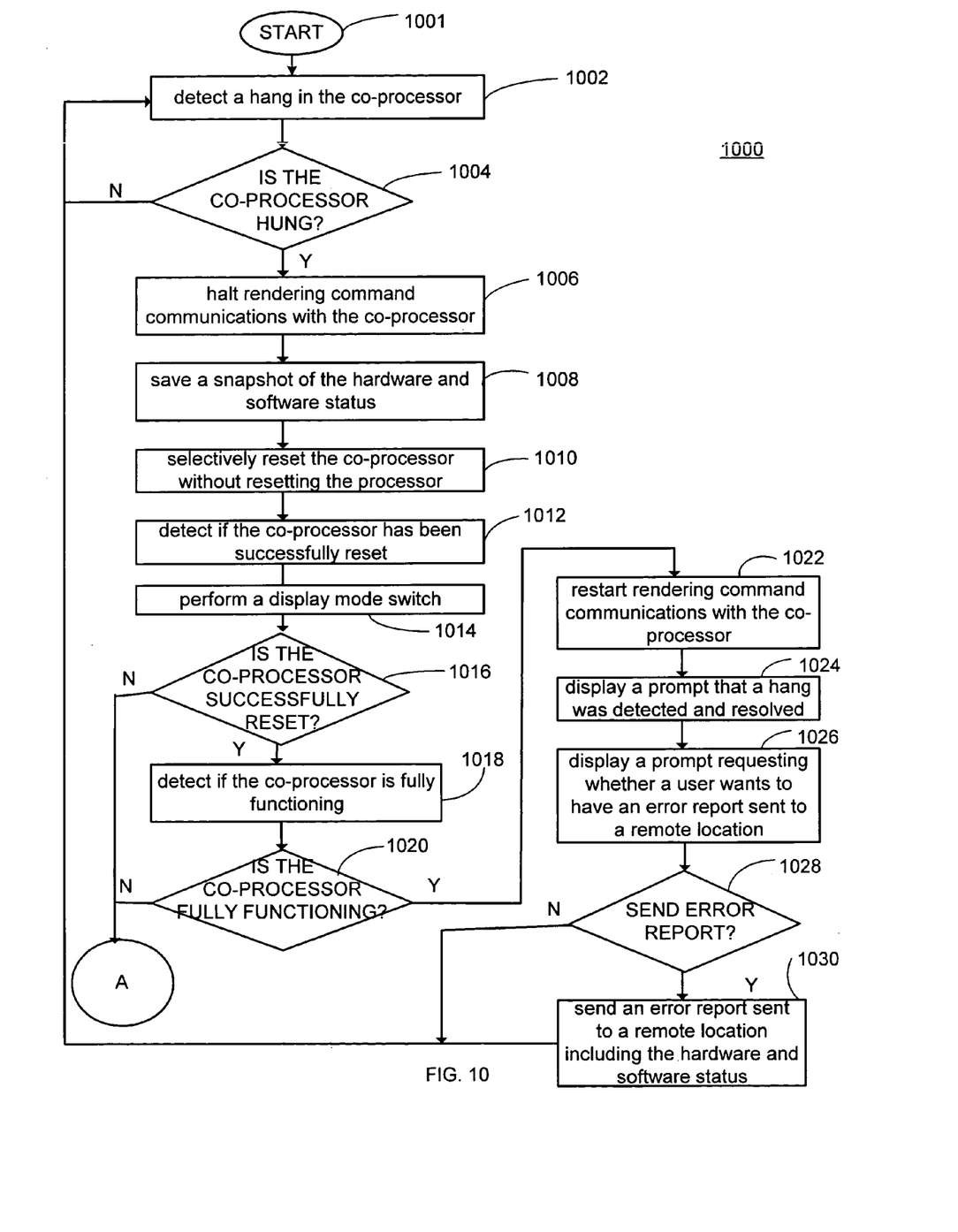
FIG. 10 is a flow chart illustrating one example of a method of monitoring and resetting a co-processor, in accordance with one embodiment of the invention.

FIG. 10 shows a flow chart 1000 detailing the operation of a particular embodiment. The process begins at node 1001. Next, in step 1002, the system attempts to detect a hang in the co-processor 102. In step 1004, the system attempts to determine whether the check of the co-processor 102 indicated that it was hung. If it was not hung then the system returns to step 1002, otherwise the system continues on to step 1006 in which the system halts the rendering command communications with the co-processor 102. After step 1006, step 1008 saves a snapshot of the hardware and software status. Subsequent to step 1008 is step 1010 where the system selectively resets the co-processor 102 without resetting the processor 104. Step 1012 follows step 1010 where the system detects if the co-processor 102 has been successfully reset. Step 1014 then performs a display mode switch.

Step 1016 is performed where the system determines if the co-processor 102 has been successfully reset. If it detects that the co-processor has not been successfully reset, then a process, which will be discussed shortly, begins in which the system will need to be rebooted. If however the system detects that the co-processor 102 was successfully reset, then step 1018 is performed where the system detects if a co-processor 102 is fully functional. Following is step 1020, in which the system determines if the co-processor 102 is fully functioning or not. If the system is not fully functioning, again the process which terminates in a system reboot is followed. Otherwise, if the system is found to be fully functioning, then step 1022 is performed. In step 1022, the system restarts the rendering command communications with the co-processor 102. Following is step 1024 in which the system displays a prompt that a hang was detected and resolved.

Next, in step 1026, the system displays a prompt requesting whether a user wants to have an error report sent to a remote location. In step 1028, the system determines whether to send an error report. If it is determined that an error report is not required then the system returns to processing at step 1002. If a report is requested, then in step 1030, an error report is sent to a remote location including the hardware and software status. After step 1030, the system returns to step 1002 where the system again attempts to detect a new hang in the co-processor. In response to either a detection that the co-processor was not fully reset in step 1016 or that the co-processor was not fully functioning as determined in step 1020, the system then proceeds to node A which is the first step in a sequence of having to reboot the corresponding processor.

Figure 11:
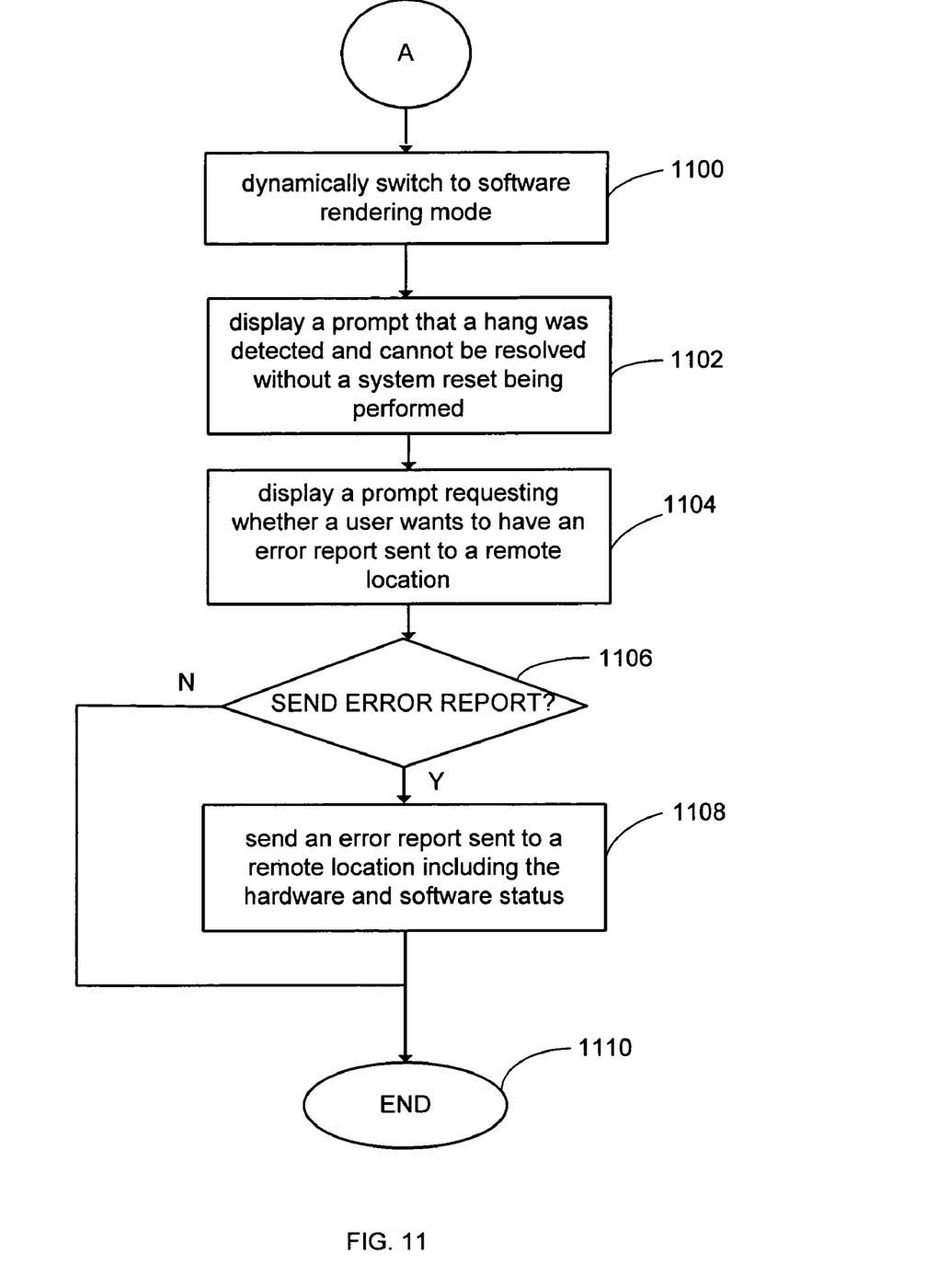
FIG. 11 is a flow chart illustrating one example of a method of monitoring and resetting a co-processor, in accordance with one embodiment of the invention.

In FIG. 11, node A is shown followed by steps 1100, 1102, 1104, 1106, 1108 and final node 1110. In step 1100, the system performs a dynamic switch to software rendering mode. Following step 1100 is step 1102 in which the system displays a prompt that the hang was detected and cannot be resolved without a system reset being performed. Following step 1102 is step 1104 in which the system performs a display of a prompt requesting that a user indicate whether they would like an error report sent to a remote location. In step 1106, the user's response is analyzed and if the request is denied then the system proceeds to step 1110 where a reboot is necessary, otherwise if a report was requested then an error report is sent to a remote location including the hardware and/or software status. After sending the report the system proceeds to step 1110 in which a reboot would be subsequently required.

It should be understood that the implementation of other variations and modifications of the invention and its various aspects will be apparent to those of ordinary skill in the art, and that the invention is not limited by the specific embodiments described. For example, the steps described above may be carried out in any suitable order. It is therefore contemplated to cover by the present invention, all modifications, variations, or equivalents that fall within the spirit and scope of the basic underlying principles disclosed and claimed herein.

What is claimed is:

1. A circuit for monitoring and resetting a co-processor comprising:
    a hang detector module operative to detect a hang in the co-processor by detecting a discrepancy between a current state of the co-processor and a current activity of the co-processor; and
    a selective processor reset module operative to selectively reset the co-processor without resetting a processor, in response to detecting a hang in the co-processor.

2. The circuit of claim 1 wherein an operating system executes on the processor.

3. The circuit of claim 1 wherein the discrepancy is detected by detecting the current state to be busy, by detecting a busy flag to be set, and detecting no progress on current activity, by detecting the same contents in a co-processor register as examined before and after a wait period.

4. The circuit of claim 1 further comprising:
    a halt communications module operative to halt command communications with the co-processor, in response to detecting a hang in the co-processor;
    a reset check module operative to detect if the co-processor has been successfully reset, in response to the resetting of the co-processor; and
    a restart communications module operative to restart command communications with the co-processor, in response to detecting that the co-processor has been successfully reset.

5. The circuit of claim 1 wherein the discrepancy is detected by comparing data representing a current state of the co-processor with data representing a current activity of the co-processor.

6. A method of monitoring and resetting a co-processor comprising:
    detecting a hang in the co-processor by detecting a discrepancy between a current state of the co-processor and a current activity of the co-processor; and
    selectively resetting the co-processor without resetting a processor, in response to detecting a hang in the co-processor.

7. The method of claim 6 wherein an operating system executes on the processor.

8. The method of claim 6 wherein the discrepancy is detected by detecting the current state to be busy, by detecting a busy flag to be set, and detecting no progress on current activity, by detecting the same contents in a co-processor register as examined before and after a wait period.

9. The method of claim 6 further comprising:
halting command communications with the co-processor, in response to detecting a hang in the co-processor;
detecting if the co-processor has been successfully reset, in response to the resetting of the co-processor; and
restarting command communications with the co-processor, in response to detecting that the co-processor has been successfully reset.

10. A system for monitoring and resetting a co-processor comprising:
a processor;
a co-processor; and
a memory containing instructions including:
hang detector module instructions operative to cause the processor to detect a hang in the co-processor by detecting the current state to be busy, as reflected in a busy flag, and detecting no progress on current activity, as reflected in the absence of co-processor register activity; and
selective processor reset module instructions operative to cause the processor to selectively reset the co-processor without resetting the processor, in response to detecting a hang in the co-processor.

11. The system of claim 10 wherein the processor is a host processor and the memory contains operating system instructions.

12. The system of claim 10 further comprising:
reset check module instructions operative to cause the processor to detect if the co-processor has been successfully reset, in response to the resetting of the co-processor.

13. The system of claim 10 further comprising:
halt communications module instructions operative to cause the processor to halt command communications with the co-processor, in response to detecting a hang in the co-processor; and
restart communications module instructions operative to cause the processor to restart command communications with the co-processor, in response to detecting that the co-processor has been successfully reset.

14. A system for monitoring and resetting a co-processor comprising:
a host processor;
a graphics processor; and
a memory containing instructions including:
hang detector module instructions operative to cause the processor to detect a hang in the graphics processor by detecting the current state of the graphics processor to be busy, as reflected in a graphics processor busy flag, and detecting the current activity of the graphics processor to be idle, as reflected in the absence of graphics processor register activity; and
selective processor reset module instructions operative to cause the processor to selectively reset the graphics processor without resetting the host processor, in response to detecting a hang in the graphics processor.

15. The system of claim 14 further comprising:
halt communications module instructions operative to cause the processor to halt rendering command communications with the graphics processor, in response to detecting a hang in the graphics processor;
reset check module instructions operative to cause the processor to detect if the graphics processor has been successfully reset, in response to the resetting of the graphics processor; and
restart communications module instructions operative to cause the processor to restart rendering command communications with the graphics processor, in response to detecting that the graphics processor has been successfully reset.

16. A system for monitoring and resetting a co-processor comprising:
a host processor;
a graphics processor; and
a memory containing instructions including:
hang detector module instructions operative to cause the processor to detect a hang in the graphics processor by detecting the current state to be busy, by detecting a busy flag to be set, and detecting no progress on current activity, by detecting the same contents in a co-processor register as examined before and after a wait period;
halt communications module instructions operative to cause the processor to halt rendering command communications with the graphics processor by setting a send flag to an off state and setting a receive flag to an off state, in response to detecting a hang in the graphics processor;
save snapshot module instructions operative to cause the processor to save a snapshot of the hardware and software status including any one or more of the following: graphics register data, graphics command queue data, chipset info, and AGP bus status, in response to the detecting a hang in the graphics processor;
selective processor reset module instructions operative to cause the processor to selectively reset the graphics processor without resetting the host processor, in response to detecting a hang in the graphics processor;
reset check module instructions operative to cause the processor to detect if the graphics processor has been successfully reset, in response to the resetting of the graphics processor;
display mode switch module instructions operative to cause the processor to perform a display mode switch, in response to the selectively resetting of the graphics processor;
functioning check module instructions operative to cause the processor to detect if the graphics processor is fully functioning, in response to the resetting of the graphics processor;
restart communications module instructions operative to cause the processor to restart rendering command communications with the graphics processor by setting the send flag to an on state, in response to detecting that the graphics processor has been successfully reset; and
software rendering module instructions operative to cause the processor to dynamically switch to software rendering mode, in response to detecting any one or more of the following: a detection that the graphics processor has not been successfully reset and a detection that the graphics processor is not fully functioning.

17. The system of claim 16 further comprising:
hang resolved prompt module instructions operative to cause the processor to display a prompt indicating that a hang was detected and resolved, in response to detecting that the graphics processor is fully functioning;
report send prompt module instructions operative to cause the processor to display a prompt requesting an input as to whether a user wants to have an error report sent to a remote location, in response to detecting a hang in the graphics processor;

report send module instructions operative to cause the processor to send an error report to a remote location including the hardware and software status, in response to receiving a user request to send an error report to a remote location; and hang unresolved prompt module instructions operative to cause the processor to display a prompt indicating that a hang was detected and cannot be resolved without a reset of the host processor being performed, in response to detecting one or more of the following: the graphics processor was not successfully reset and the graphics processor is not fully functioning.

18. A memory containing instructions executable on a processor that causes the processor to:

detect a hang in a co-processor by detecting a discrepancy between a current state of the co-processor and a current activity of the co-processor; and selectively reset the co-processor without resetting the processor, in response to detecting a hang in the co-processor.

19. The memory of claim 18 further including instructions that causes the processor to:

detect if the co-processor has been successfully reset, in response to the resetting of the co-processor.

20. A circuit for monitoring and resetting a co-processor comprising:

a hang detector module operative to detect a hang in the co-processor by detecting a discrepancy between a current state of the co-processor and data in one or more storage elements associated with the co-processor, wherein the data in the one or more storage elements represents a current activity of the co-processor; and a selective processor reset module operative to selectively reset the co-processor without resetting a processor, in response to detecting a hang in the co-processor.

21. The circuit of claim 20 wherein:

the one or more storage elements includes a co-processor register; and the discrepancy is detected by detecting the current state to be busy, by detecting a busy flag to be set, and detecting no progress on current activity, by detecting the same contents in a co-processor register as examined before and after a wait period.

22. The circuit of claim 20 wherein the hang detector module is operative to determine if the data in the one or more storage elements reflects processing of instructions by the co-processor.

23. The circuit of claim 20, wherein the current state of the co-processor is represented by data stored in the one or more storage elements associated with the co-processor.

24. A method of monitoring and resetting a co-processor comprising:

detecting a hang in the co-processor by detecting a discrepancy between a current state of the co-processor and data in one or more storage elements associated with the co-processor, wherein the data in the one or more storage elements represents a current activity of the co-processor; and selectively resetting the co-processor without resetting a processor, in response to detecting a hang in the co-processor.

25. The method of claim 24 wherein:

the one or more storage elements includes a co-processor register; and the discrepancy is detected by detecting the current state to be busy, by detecting a busy flag to be set, and detecting no progress on current activity, by detecting the same contents in a co-processor register as examined before and after a wait period.

26. The method of claim 24 further comprising determining if the data in the one or more storage elements reflects processing of instructions by the co-processor.

27. The method of claim 24, wherein the current state of the co-processor is represented by data stored in the one or more storage elements associated with the co-processor.

28. A memory containing instructions executable on a processor that causes the processor to:

detect a hang in a co-processor by detecting a discrepancy between a current state of the co-processor and data in one or more storage elements associated with the co-processor, wherein the data in the one or more storage elements represents a current activity of the co-processor; and selectively reset the co-processor without resetting the processor, in response to detecting a hang in the co-processor.

* * * * *